Patented Apr. 26, 1938

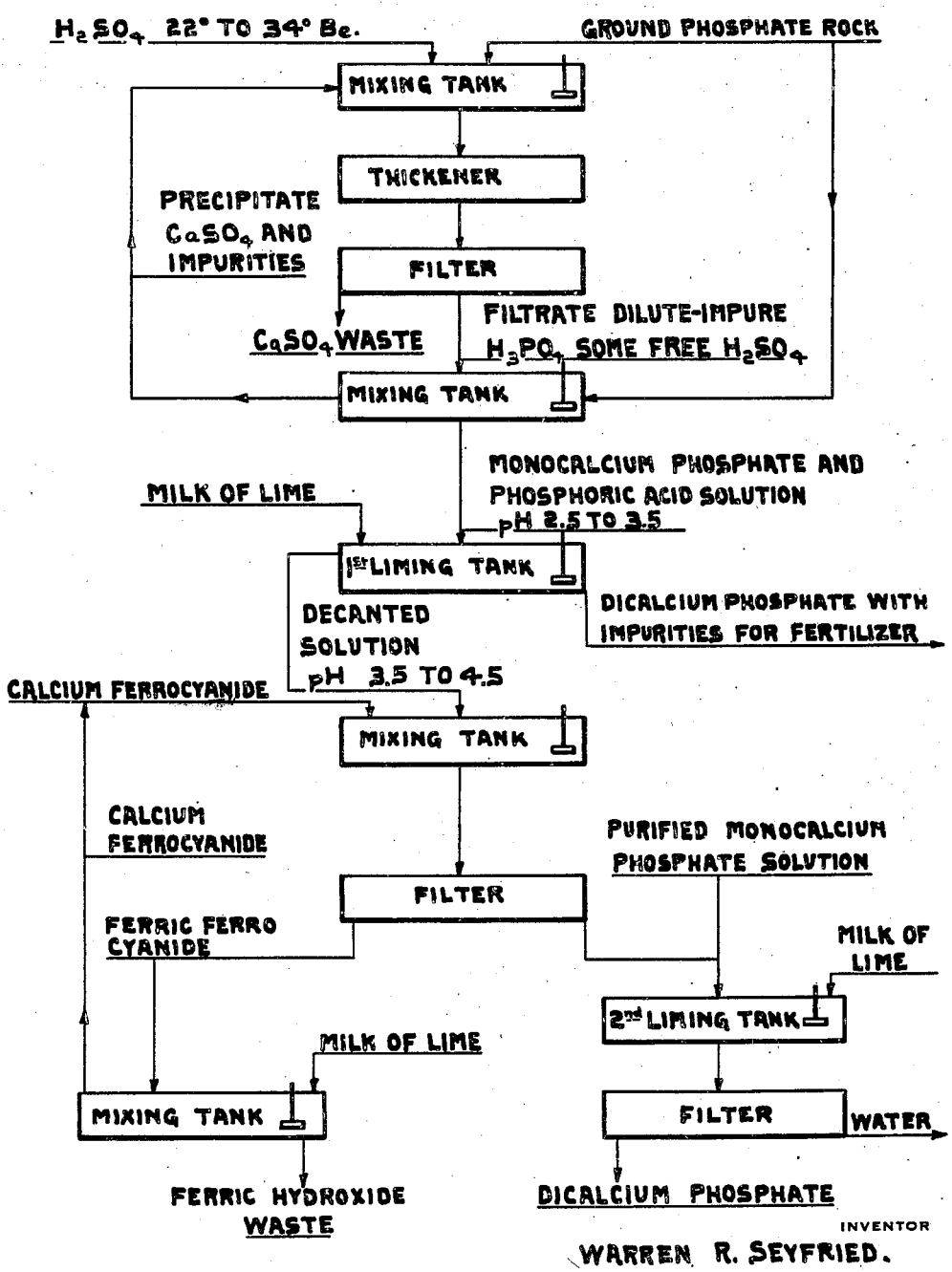

2,115,150

UNITED STATES PATENT OFFICE 2,115,150

PRODUCTION OF DICALCIUM PHOSPHATE

Warren R. Seyfried, Birmingham, Ala.

Application March 5, 1936, Serial No. 67,290

2 Claims. (Cl. 23—109)

My invention relates to the production of phosphoric acid and phosphates, particularly dicalcium phosphate, from phosphate rock, by the sulphuric acid process.

One of the objects of my invention is to provide a process in which sulphuric acid of a lower strength is employed than has heretofore been considered economical, and without the necessity of concentration of the weak phosphoric acid thus produced.

Another object of my invention is to utilize the acidity of the phosphoric acid produced when phosphate rock is treated with sulphuric acid, to digest more phosphate rock, and thus reduce considerably the amount of sulphuric acid and lime required, and at the same time practically eliminate $SO_3$, and materially reduce the amount of iron, aluminum, and fluorine compounds from the phosphoric acid solution.

A still further object of my invention is to provide a simple, economical means of purifying phosphoric acid and phosphate solutions, whereby dicalcium phosphate suitable for incorporation in food products may be more economically produced.

A more particular object of my invention is to provide a simple, economical process for producing sulphate free dicalcium phosphate for fertilizer purposes.

A still further object of my invention is to provide, in a process of the character described, a simple, effective means for ridding the phosphate solution formed as an intermediate step of the process, of residual iron compounds, and for regenerating the reagent employed.

In the production of phosphoric acid and phosphates from phosphate rock by the sulphuric acid process, it has heretofore been the almost universal practice to react ground phosphate rock with sulphuric acid in an amount sufficient to convert the phosphorous content to free phosphoric acid. The mixture must be diluted either before digestion or after in order to separate the phosphoric acid from the calcium sulphate and other insolubles. The phosphoric acid is then usually concentrated and subjected to purification steps to rid it of iron, aluminum, arsenic and fluorine compounds. In addition, the phosphoric acid is carrying in solution a considerable amount of calcium sulphate which has heretofore been considered very difficult of elimination. Also, a demand has arisen for phosphatic fertilizers free of sulphur compounds, due to the effect that such compounds have on certain crops.

Following the production and the purification of the phosphoric acid as just outlined, it has been the practice to treat the phosphoric acid with lime in order to produce mono and dicalcium phosphate. The so-called triple superphosphates are usually produced by reacting the phosphoric acid with more phosphate rock and aging of the mixture thus produced. Such phosphates carry with them all of the insolubles and impurities of the phosphate rock.

In the production of dicalcium phosphate, it has been necessary to exert particular care in order that tricalcium phosphate be not produced. The tricalcium phosphate is objectionable because of its extreme fineness which makes filtration difficult and also because it is partially unavailable for fertilizer purposes.

In accordance with my invention, I have overcome many of the difficulties heretofore encountered. My invention will be better understood by reference to the accompanying flow sheet, which illustrates the principal features of my invention.

In a suitable mixing tank provided with agitators, I react ground phosphate rock with sulphuric acid having a strength of from 25% to 40% $H_2SO_4$ (22° to 34° Bé.). In carrying out this reaction I introduce from 1% to 5% $H_2SO_4$ in excess of that required to liberate all of the $P_2O_5$ content of the rock as free phosphoric acid. By the use of the dilute sulphuric acid in excess in this manner, I have found that I can thus produce easily filterable calcium sulphate crystals of large size, and a solution dilute enough that ready separation from the insolubles is obtained in the filter. The filtrate which is passed to a mixing tank will contain a solution of phosphoric acid of from 15% to 25% strength, (depending upon the amount of wash water included), the excess of sulphuric acid, iron and aluminum sulphates, some calcium sulphate, fluorine compounds, and other impurities.

I have discovered that the sulphates in solution may be practically eliminated and the major portion of the iron, aluminum, and fluorine compounds may be precipitated out of the solution by the addition of ground phosphate rock to the dilute solution. The metallic sulphates are thus converted to insoluble phosphates and calcium sulphate, while the fluorides are precipitated as insoluble $CaF_2$ and $CaSiF_6$. The solution should be agitated, as shown, in order to bring about as thorough a reaction as possible.

This procedure not only accomplishes the purpose of ridding the solution of the major portion of its impurities, but it utilizes the acidity of the phosphoric acid to cut down the lime consumption in the subsequent liming operations, to produce dicalcium phosphate. Furthermore, by thus utilizing the acidity of the dilute phosphoric acid, it reduces the over all consumption of sulphuric acid in the process by from 30% to 50%. By actual test on many runs, I have found that around 93% of the sulphates in solution are thus precipitated. An excess of phosphate rock for this purpose may be safely introduced as the reaction will not go to the formation of either di- or tricalcium phosphate, and the insoluble residue may be returned to the original mixing tank for digestion with sulphuric acid to recover the $P_2O_5$ content.

The dilute solution of phosphoric acid does not attack the ground phosphate rock with the same avidity as strong acid so that only from 30% to 50% of the acidity is utilized. After decanting off the solution, it will be found to be a mixture of phosphoric acid and monocalcium phosphate having a pH of from 2.5 to 3.5.

The arsenic in the solution may be precipitated by introduction of hydrogen sulphide or sodium sulphide, as is well understood, at any convenient point in the process.

The solution freed of arsenic and sulphates and the major portion of its iron, aluminum, and fluorine compounds, is next passed to what is designated on the flow sheet as the first liming tank, where milk of lime is added until the solution has a pH of from 3.50 to 4.50. This precipitates some dicalcium phosphate and practically all of the remaining iron, aluminum and fluorine compounds, the solution, however, still retaining a small percentage of iron compounds. The precipitate thus formed may be further limed to react with the monocalcium phosphate present to form dicalcium phosphate and be utilized as fertilizer.

The clear solution having a pH of from 3.50 to 4.50 is decanted or filtered and passed to a mixing tank, where it is further diluted with approximately two parts of water to one of solution. I have discovered that at this concentration, and at a pH above 3.50, ferric-ferrocyanide is insoluble therein, and an alkali ferrocyanide, such as calcium, sodium or potassium ferrocyanide, will react with the iron present in the solution to form the insoluble ferric-ferrocyanide and the corresponding phosphate. The lower limit of pH at which ferric-ferrocyanide is insoluble varies slightly with the concentration and temperature of the solution.

The amount of the alkali ferrocyanide to be added is determined by first analyzing the solution for iron and then adding the requisite amount of alkali ferrocyanide to react therewith. It is better to add first a slight deficiency and then approach the final end point by small additions and subsequent testing. It is the usual practice to stop the addition of alkali ferrocyanide with a slight trace of iron still in solution, so that no soluble ferrocyanides will appear in the filtrate. However, any excess ferrocyanide may be readily and completely removed by the addition of a soluble copper salt and again filtering.

It is essential that the iron in the solution be present in the ferric state before precipitation as ferric-ferrocyanide. This is readily accomplished by aeration of the solution or by any of the well known means of oxidizing the iron to the ferric state.

I have further discovered that there is precipitated with the ferric-ferrocyanide, by occlusion or otherwise, practically all of any remaining fluorine compounds in the solution.

Inasmuch as I propose to recover the reagent employed, I prefer to use calcium ferrocyanide as the alkali reagent for precipitating the residual iron in the solution. After the iron compounds have precipitated, the solution is again filtered, and there is thereby produced a clear solution of monocalcium phosphate free of impurities, which may be further treated in a known manner to produce pure di- or tricalcium phosphate, or other phosphates. As shown on the flow sheet, milk of lime is added thereto in what is designated as second liming tank to produce dicalcium phosphate.

The ferric-ferrocyanide precipitated upon treatment of the solution with the calcium ferrocyanide is next reacted with milk of lime, whereupon it goes into solution as calcium ferrocyanide and ferric hydroxide is precipitated. This solution is filtered to free it from insolubles and is then ready for reuse in the process.

From the foregoing it will be observed that I have devised a process for the production of calcium phosphates which is simple and economical, and in which phosphates of high purity are produced, utilizing acids of strength lower than have heretofore been considered economical, and without the concentration steps heretofore considered necessary. It will furthermore be noted that I have devised simple and economical procedures for ridding the phosphates of the impurities contained therein, thereby producing materials of high purity at a minimum cost and with a minimum of operations.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A process of producing dicalcium phosphate which comprises digesting phosphate rock with sulphuric acid of 25% to 40% strength, the acid employed being 1% to 5% in excess of the amount calculated to liberate the $P_2O_5$ content of the rock as $H_3PO_4$, filtering the resulting solution of phosphoric and sulphuric acids, adding to the solution ground phosphate rock in an amount sufficient to react with the sulphuric acid present and to precipitate dissolved calcium sulphate and to utilize from 30% to 50% of the acidity of the phosphoric acid present to form monocalcium phosphate, separating the solution from the precipitate, and adding lime to the solution to form dicalcium phosphate.

2. A process of producing dicalcium phosphate which comprises digesting phosphate rock with sulphuric acid of from 22° to 34° Bé. strength to produce a solution of phosphoric acid containing from 1% to 5% free sulphuric acid, precipitating the dissolved sulphates out of the solution and ridding it of sulphuric acid by the addition of ground phosphate rock thereto, separating the resulting solution of monocalcium phosphate and phosphoric acid and adding milk of lime thereto to raise its pH to at least 3.50, separating the precipitate from the solution, treating the solution with an alkali ferrocyanide to precipitate the residual iron therefrom, separating the precipitate from the solution, and then adding more milk of lime to produce dicalcium phosphate.

WARREN R. SEYFRIED.